No. 896,942. PATENTED AUG. 25, 1908.
P. RUDISCH.
DISINFECTING APPARATUS.
APPLICATION FILED MAY 22, 1908.

Witnesses:
Arthur E. Jumpe.
W. R. Schulz.

Inventor
Phineas Rudisch
By his Attorney

UNITED STATES PATENT OFFICE.

PHINEAS RUDISCH, OF NEW YORK, N. Y.

DISINFECTING APPARATUS.

No. 896,942.

Specification of Letters Patent.

Patented Aug. 25, 1908.

Application filed May 22, 1908. Serial No. 434,280.

*To all whom it may concern:*

Be it known that I, PHINEAS RUDISCH, a citizen of the United States, residing at New York city, Manhattan, county and State of New York, have invented new and useful Improvements in Disinfecting Apparatus, of which the following is a specification.

This invention relates to a disinfecting apparatus more particularly designed to charge steam with a volatilized disinfectant, so as to produce an active disinfecting gas. This gas is well adapted for the purification of sick rooms and for similar purposes.

Figure 1:
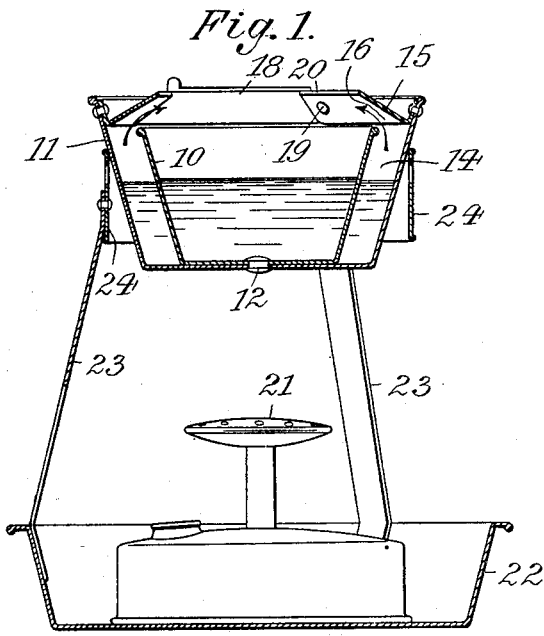
Figure 2:
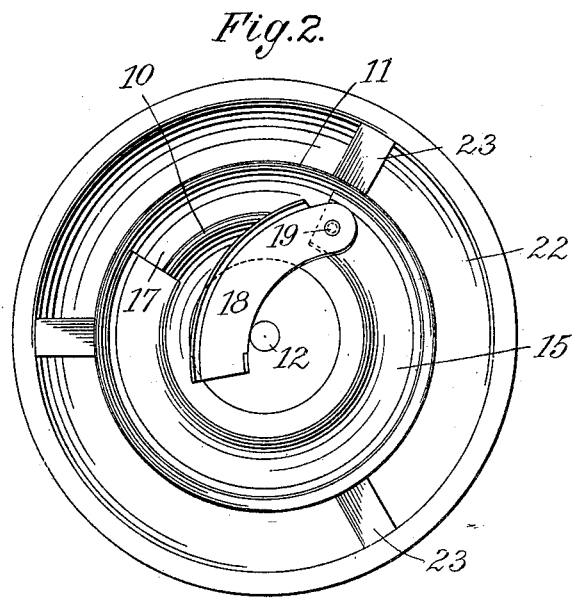

In the accompanying drawing: Figure 1 is a vertical central section, partly in elevation, of my improved disinfecting apparatus, and Fig. 2 a plan thereof.

A cup or vessel 10, designed to hold water, is inclosed within a larger and higher vessel 11, the two vessels being connected at their bottom by a rivet 12, or otherwise. In this way there is formed around cup 10 an annular chamber 14 designed to contain a volatilizable solid disinfectant. From the inner side of vessel 11 there extends inwardly and upwardly an inclined imperforate deflector or shield 15 that projects over and above the edge of vessel 10, so as to leave an intervening clearance or gas passage 16. Deflector 15 has a charging opening 17 adapted to be closed by a curved lid 18 pivoted to deflector 15 at 19. When this lid is closed it forms a complement of the deflector, the latter being then of continuous annular form. The width of the deflector is such, that though extending entirely over chamber 14, it projects but partly over vessel 10, thus leaving a large central discharge opening 20 above the latter.

The device constructed as described is adapted to be supported above a lamp 21, so as to become heated thereby. As shown, lamp 21 is placed into a pan 22 from which extend upwardly a series of arms 23, to the upper converging ends of which a ring-shaped holder 24 is riveted. Vessel 11 is made of tapering form, so that when placed into the holder, it will be removably sustained by the upper edge thereof.

In use, vessel 10 is filled with water, while a solid volatilizable chemical, such as trioxymethylene, is placed into chamber 14. Under the action of the heat emitted by lamp 21, this chemical is volatilized, the gases being inflected by shield 15 to pass over the steam generated in vessel 10. In this way the steam becomes charged with the volatilized chemical, constituting a carrier therefor, and forming collectively therewith an active formaldehyde gas well adapted for disinfecting purposes.

I claim:

1. A disinfecting apparatus comprising an outer vessel, an inclosed inner vessel, an annular deflector extending from the wall of the outer vessel above the edge of the inner vessel to leave an intervening clearance, a curved lid pivoted to the deflector and forming a complement thereof, and means for heating both vessels, substantially as specified.

2. A disinfecting apparatus comprising an outer vessel having a bottom, an inner vessel having a bottom which is riveted to the bottom of the outer vessel, an annular imperforate deflector extending from the wall of the outer vessel above the edge of the inner vessel to leave an intervening clearance, and means for heating both vessels, substantially as specified.

Signed by me at New York city, (Manhattan,) N. Y., this 14th day of April, 1908.

PHINEAS RUDISCH.

Witnesses:
 FRANK V. BRIESEN,
 AUGUST MINER.